US011942012B2

(12) United States Patent
Zhou et al.

(10) Patent No.: US 11,942,012 B2
(45) Date of Patent: Mar. 26, 2024

(54) DISPLAY PANEL, DISPLAY DEVICE AND METHOD FOR FABRICATING THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Hongjun Zhou, Beijing (CN); Lili Du, Beijing (CN); Feng Wei, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 30 days.

(21) Appl. No.: 17/789,996

(22) PCT Filed: Aug. 5, 2021

(86) PCT No.: PCT/CN2021/110794
§ 371 (c)(1),
(2) Date: Jun. 29, 2022

(87) PCT Pub. No.: WO2022/062708
PCT Pub. Date: Mar. 31, 2022

(65) Prior Publication Data

US 2023/0033513 A1 Feb. 2, 2023

(30) Foreign Application Priority Data

Sep. 24, 2020 (CN) ........................ 202011015612.X

(51) Int. Cl.
*G09G 3/20* (2006.01)

(52) U.S. Cl.
CPC ....... *G09G 3/20* (2013.01); *G09G 2310/0286* (2013.01); *G09G 2310/0297* (2013.01); *G09G 2330/021* (2013.01)

(58) Field of Classification Search
CPC ............. G09G 3/20; G09G 2310/0286; G09G 2310/0297; G09G 2330/021
See application file for complete search history.

(56) References Cited

U.S. PATENT DOCUMENTS

| | | | |
|---|---|---|---|
| 10,235,917 | B2 | 3/2019 | Jung et al. |
| 2017/0077199 | A1 | 3/2017 | Nguyen et al. |

(Continued)

FOREIGN PATENT DOCUMENTS

| | | | |
|---|---|---|---|
| CN | 106448587 | A | 2/2017 |
| CN | 106504696 | A | 3/2017 |

(Continued)

OTHER PUBLICATIONS

Office Action issued for Chinese Application No. 202011015612.X, dated Apr. 30, 2021, 15 pages.

(Continued)

*Primary Examiner* — Sejoon Ahn
(74) *Attorney, Agent, or Firm* — Raj S. Dave; Dave Law Group LLC

(57) ABSTRACT

Embodiments of the present disclosure provide a display panel, a display device including the display panel and a method for fabricating the display panel. The display panel comprises a display area and a non-display area surrounding the display area. The display panel includes a pixel array, an edge of which defines a boundary between the display area and the non-display area, wherein the non-display area includes a first area and a second area arranged in sequence in a direction away from the pixel array; a compensation circuit configured to compensate for a parasitic capacitance (Continued)

of pixel in the pixel array, and including a first portion located in the first area and a second portion located in the second area; and a first shift register located in the second area. The second portion of the compensation circuit is aligned with the first shift register circuit in a circumferential direction of the pixel array.

20 Claims, 6 Drawing Sheets

(56) References Cited

U.S. PATENT DOCUMENTS

| | | | | |
|---|---|---|---|---|
| 2017/0154572 | A1* | 6/2017 | Kim | G09G 3/3266 |
| 2017/0154577 | A1* | 6/2017 | Lee | G09G 3/3275 |
| 2017/0154579 | A1* | 6/2017 | Choi | H10K 59/179 |
| 2017/0154945 | A1 | 6/2017 | Shin et al. | |
| 2018/0342194 | A1 | 11/2018 | Li et al. | |
| 2019/0066560 | A1* | 2/2019 | Mi | G11C 19/28 |
| 2019/0066562 | A1* | 2/2019 | Hu | G09G 3/3677 |
| 2019/0066617 | A1* | 2/2019 | Zhao | G11C 19/287 |
| 2019/0068196 | A1* | 2/2019 | Feng | H03K 19/215 |
| 2019/0304558 | A1 | 10/2019 | Dun et al. | |
| 2020/0035166 | A1 | 1/2020 | Zhu et al. | |
| 2022/0344437 | A1 | 10/2022 | Wang et al. | |

FOREIGN PATENT DOCUMENTS

| | | | |
|---|---|---|---|
| CN | 106847085 | A | 6/2017 |
| CN | 108991990 | A | 7/2017 |
| CN | 108037626 | A | 5/2018 |
| CN | 108711575 | A | 10/2018 |
| CN | 108877658 | A | 11/2018 |
| CN | 111192903 | A | 5/2020 |
| CN | 111599847 | A | 8/2020 |
| CN | 112086065 | A | 12/2020 |
| EP | 3174042 | A2 | 5/2017 |
| KR | 20170105173 | A | 9/2017 |

OTHER PUBLICATIONS

Office Action issued for Chinese Application No. 202011015612.X, dated Nov. 30, 2021, 23 pages.

* cited by examiner

DISPLAY PANEL, DISPLAY DEVICE AND METHOD FOR FABRICATING THEREOF

CROSS-REFERENCE TO RELATED APPLICATIONS

This patent application is a National Stage Entry of PCT/CN2021/110794 filed on Aug. 5, 2021, and this patent application claims the benefit and priority of Chinese Patent Application No. 202011015612.X filed on Sep. 24, 2020, the disclosures of which are incorporated by reference herein in their entirety as part of the present application.

TECHNICAL FIELD

Embodiments of the present disclosure relate to the field of display technology, and more particularly, to a display panel, a display device and a method for fabricating thereof.

BACKGROUND

In recent years, with the development of liquid crystal and Organic Light-Emitting Diode (OLED) technologies, display panels have been gradually applied in many fields such as smartphones, wearable devices, tablet computers, televisions, virtual reality devices, and the like. At the same time, there are various special-shaped designs in the display panels, including bang-shaped screen, water drop-shaped screen, circular screen, etc. There are increasing demands of users for the display panels with narrow bezels.

BRIEF DESCRIPTION

Embodiments of the present disclosure provide a display panel, a display device including the display panel, and a method for fabricating the display panel.

A first aspect of the present disclosure provides a display panel. The display panel includes a display area and a non-display area surrounding the display area. The display panel includes a pixel array. An edge of the pixel array defines a boundary between the display area and the non-display area. The non-display area includes a first area and a second area arranged in sequence in a direction away from the pixel array. The display panel further includes a compensation circuit. The compensation circuit is configured to compensate for a parasitic capacitance of pixel in the pixel array. The compensation circuit includes a first portion located in the first area and a second portion located in the second area. And the display panel further includes a first shift register located in the second area. The second portion of the compensation circuit is aligned with the first shift register circuit in a circumferential direction of the pixel array.

In some embodiments of the present disclosure, the pixel array comprises a special-shaped outline.

In some embodiments of the present disclosure, the first shift register circuit and the second portion of the compensation circuit are alternately arranged in the circumferential direction.

In some embodiments of the present disclosure, the non-display area includes a first half area and a second half area divided by a center line of the pixel array, wherein the display panel further includes a pad area, wherein the pad area is disposed adjacent to the first half area, and wherein the second portion of the compensation circuit and the first shift register circuit are in the second half area.

In some embodiments of the present disclosure, the center line is perpendicular to a line connecting a center of the pad area and a center of the pixel array.

In some embodiments of the present disclosure, the display panel further includes a power supply line located in the second area and the first half area.

In some embodiments of the present disclosure, the display panel further includes a reset signal line. The reset signal line is configured to provide a reset voltage signal to the pixels. The reset signal line is in the second area and surrounds the first area.

In some embodiments of the present disclosure, the display panel further includes a second shift register circuit and a multiplexing circuit both located in the first half area and on a side, away from the first area, of the power supply line. The multiplexing circuit is configured to multiplex data signal lines for the pixels.

In some embodiments of the present disclosure, the second shift register circuit and the multiplexing circuit are alternately arranged in the circumferential direction.

In some embodiments of the present disclosure, the display panel further includes a wiring area. The wiring area is located in the first half area and located on a side, away from the first area, of the second shift register circuit and the multiplexing circuit.

In some embodiments of the present disclosure, the display panel further includes a ground line. The ground line is located in a third area of the non-display area. The third area surrounds the second area and is located between the second area and the pad area.

A second aspect of the present disclosure provides a display device. The display device includes any display panel according to the first aspect.

A third aspect of the present disclosure provides a method for fabricating any display panel according to the first aspect. The method includes providing a substrate; forming at least one display panel on the substrate; forming a test circuit for testing the display panel on the substrate; testing the display panel by the test circuit; and cutting the substrate to isolate the at least one display panel and separate the at least one display panel from the test circuit.

Further aspects and scope of adaptability will become apparent from the description provided herein. It could be understood that various aspects of the present application may be implemented alone or in combination with one or more other aspects. It would also be understood that the description and specific embodiments herein are for purposes of illustration only and are not intended to limit the scope of the application.

BRIEF DESCRIPTION OF THE DRAWINGS

The drawings described herein are only for purposes of illustrating selected embodiments but not all possible implementations, and not intended to limit the scope of the application, in which.

Corresponding reference numerals indicate corresponding parts or features throughout the various views of the drawings.

DETAILED DESCRIPTION

Figure 1:
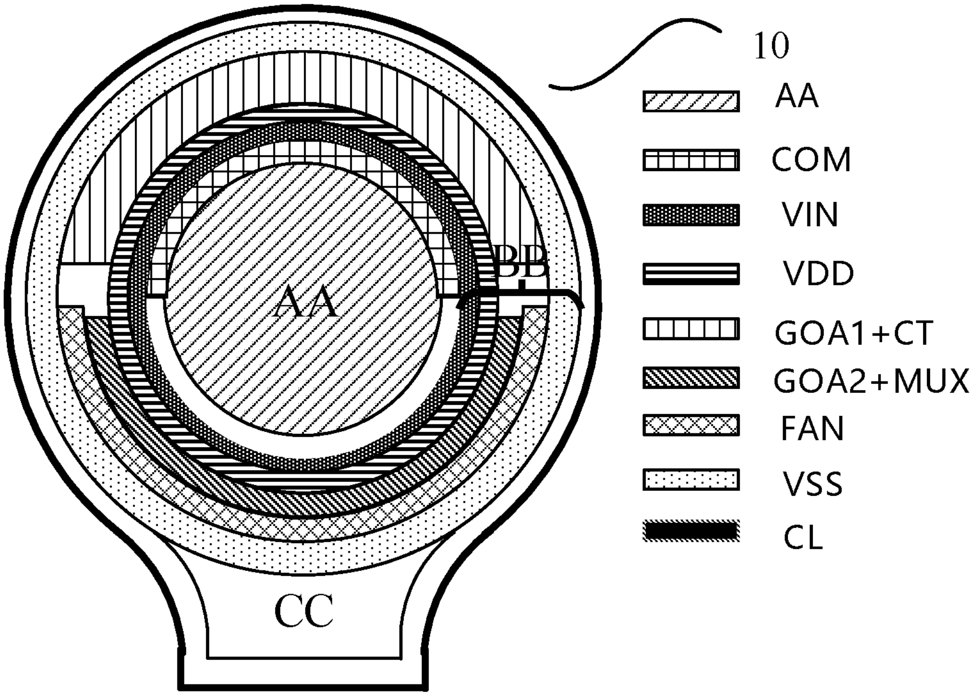
FIG. 1 shows a schematic diagram of a display panel with the related technology.

First, it should be noted that unless the context clearly dictates otherwise, the singular forms of words used herein and in the appended claims include the plural, and vice versa. Thus, when referring to the singular, the plural of the corresponding term is generally included. Similarly, the words "comprising" and "including" are to be interpreted as inclusively rather than exclusively. Likewise, the terms "including" and "or" should be construed to be inclusive unless otherwise indicated herein. Where the term "examples" is used herein, particularly when it follows a listing of terms is merely exemplary and illustrative, and should not be deemed to be exclusive or comprehensive.

In addition, it should also be noted that when introducing elements of the present application and embodiments thereof, the articles "a", "an", "the", and "said" are intended to mean that there are one or more of the elements; unless otherwise stated, "a plurality" of means two or more; the terms "comprising", "including", "containing" and "having" are intended to be inclusive and mean that there may be additional elements other than the listed elements; the terms "first", "second", "third", etc. are used for descriptive purposes only and should not be construed to indicate or imply relative importance and formation order.

Further, in the drawings, the thicknesses and areas of various layers are exaggerated for clarity. It could be understood that when a layer, area, or component is referred to be "on" another part, which means that it is directly on the other part, or other components may also be between them. Conversely, when a component is referred to be "directly" on the top of another component, it means that no other component is between them.

As mentioned above, with the development of technology, there are the increasing demands of people for narrowing of the bezel of the display panel. Therefore, to meet these demands, it is necessary to continuously improve a layout of the non-display area of the display panel. In particular, for the display panels with the special-shaped outline, compared to conventional display panels with rectangular outline, more design efforts are required to achieve narrow bezels, so as to achieve a more compact and reasonable layout.

The layout of the display panel with the related technology will be described below with reference to FIGS. 1 to 3. In this description, the display panel with the special-shaped outline indicates that the outline is not a regular rectangle, such as the rectangle with rounded corners, a circle, and the like. FIG. 1 shows a schematic diagram of the display panel according to an embodiment of the present disclosure. As shown in FIG. 1, the display panel 10 includes a circular display area AA, the non-display area BB surrounding the circular display area AA, and a pad area CC adjacent to the non-display area BB. Since the number of pixels in each column of the circular display device is not completely the same, a parasitic capacitance of pixel in each column is not completely the same, which affects display uniformity of the display device. Therefore, a compensation circuit COM is required to compensate the parasitic capacitance of pixel to improve the display uniformity. The display panel 10 includes a pixel array, the compensation circuit COM, a reset signal line VIN for supplying a reset signal to the pixels, a power supply line VDD, a first shift register circuit GOA1 for supplying a gate control signal to the pixels, and a test circuit CT for testing the display panel, a second shift register circuit GOA2 for supplying a gate control signal to pixels, a multiplexing circuit MUX for multiplexing data signal lines for pixels, a wiring area FAN, and a ground line VSS. Specifically, in the upper half of the non-display area BB, the compensation circuit COM, the reset signal line VIN, the power supply line VDD, the first shift register circuit GOA1, the test circuit CT, and the ground line VSS are sequentially arranged in a direction away from the display area AA. In the lower half of the non-display area BB, the reset signal line VIN, the second shift register circuit GOA2, the multiplexing circuit MUX, the wiring area FAN, and the ground line VSS are sequentially arranged in the direction away from the display area AA. In addition, cutting lines (not shown) are also arranged at a periphery of the non-display area BB and the pad area CC. In the process of fabricating the display panels, cutting is performed along the cutting line to isolate the display panel. The reset signal line VIN, the power supply line VDD, the ground line VSS, and the cutting line CT in the first half portion and the second half portion of the non-display area BB are continuous in the circumferential direction. For the convenience of illustrating and drawing, the areas where respective electrical components are located are shown as arcs or rings, but this is only illustrative and not limitative. In addition, in the upper half of the non-display area BB, the relative positions of the reset signal line VIN, the power supply line VDD, and the first shift register circuit GOA1 and the test circuit CT are illustrative and not limitative. Similarly, in the lower half of the non-display area BB, the reset signal line VIN, the second shift register circuit GOA2 and the multiplexing circuit MUX are also illustrative and not limitative. Those skilled in the art can design this according to the specific implementation. The upper half and the lower half of the non-display area BB will be described below with reference to FIGS. 2 and 3.

Figure 2:
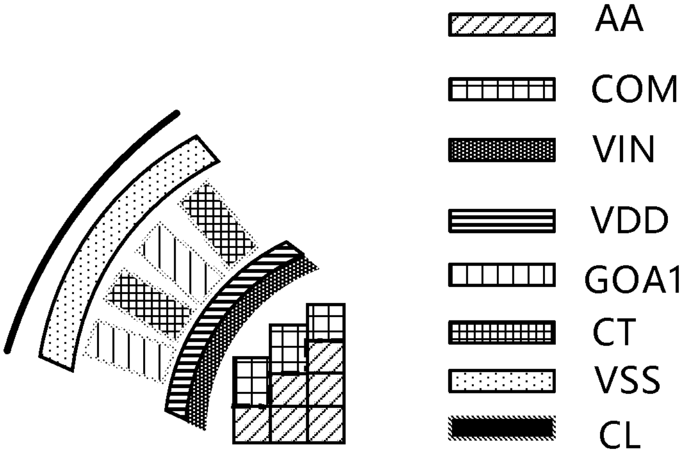
FIG. 2 shows a partial schematic view of an upper half of a non-display area of the display panel as shown in FIG. 1.

FIG. 2 shows a partial schematic view of the upper half of the non-display area BB of the display panel as shown in FIG. 1. As shown in FIG. 2, an edge of the pixel array is step-shaped. The step-shaped edge defines a boundary between the display area AA and the non-display area BB. The compensation circuit COM is only provided adjacent to the step-shaped edge of the pixel array. The first shift register GOA1 and the test circuit CT are alternately arranged in the circumferential direction. FIG. 2 only shows a case in which one first shift register GOA1 and one test circuit CT are alternately arranged. Other alternate arrangements are also possible.

Figure 3:
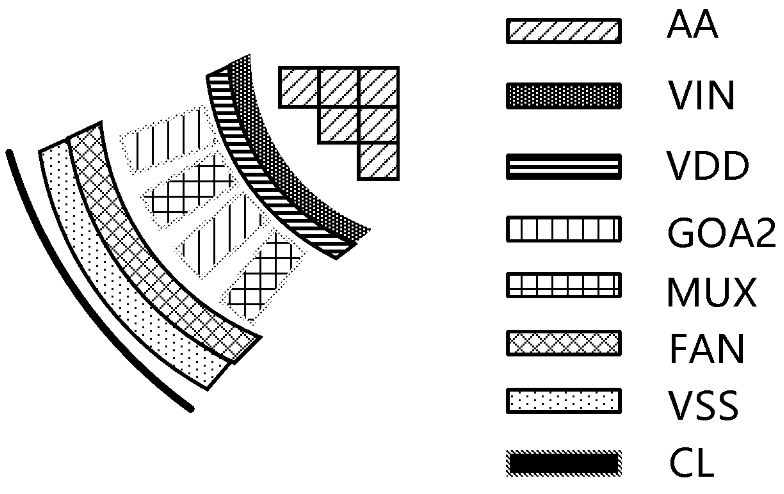
FIG. 3 shows a partial schematic view of a lower half of the non-display area of the display panel as shown in FIG. 1.

FIG. 3 shows a partial schematic view of the lower half of the non-display area BB of the display panel as shown in FIG. 1. As shown in FIG. 3, the second shift register GOA2 and the multiplexing circuit MUX are alternately arranged in the circumferential direction. Similar to FIG. 2, FIG. 3 only shows a case in which one second shift register GOA2 and one multiplexing circuit MUX are alternately arranged. Other alternate arrangements are also possible.

As mentioned above, since the number of pixels in each pixel row and in each pixel column is not exactly the same, and the parasitic capacitance of pixel in each row and in each column is not exactly the same, it is necessary to compensate for the parasitic capacitance of pixel by the compensation circuit COM. However, the compensation circuit COM increases the area of the non-display area BB, which is unfavourable for realizing the narrow bezel. Especially for the display panel with a circular shape, the difference between the number of pixels in the center pixel column and that in the edge pixel column is relatively large, and the parasitic capacitance difference between the center pixel column and the edge pixel column is also relatively large, accordingly the area occupied by the compensation circuit COM for the pixel column with the smallest number of pixels is relatively larger as well. Therefore, the upper half of the non-display area BB where the compensation circuit COM is located limits the width of the bezel of the display panel with circular shape.

As to this technical problem, the present disclosure proposes the display panel, where the test circuit CT is not included, and the electrical components in the non-display area BB are rearranged accordingly. In an embodiment of the present disclosure, the non-display area BB includes a first area BB1 and a second area BB2 that are sequentially arranged in a direction away from the pixel array. All or a part of the compensation circuits COM is arranged in the second area BB2. Thereby, a part of the area saved by removing the test circuit CT can be used to arrange all or part of the compensation circuits COM, so that the width of the bezel can be reduced as a whole.

The embodiments of the present disclosure provide the display panel, the display device including the display panel, and the method for fabricating the display panel. The embodiments of the present disclosure and the examples thereof will be described in detail below with reference to the accompanying drawings.

Figure 4:
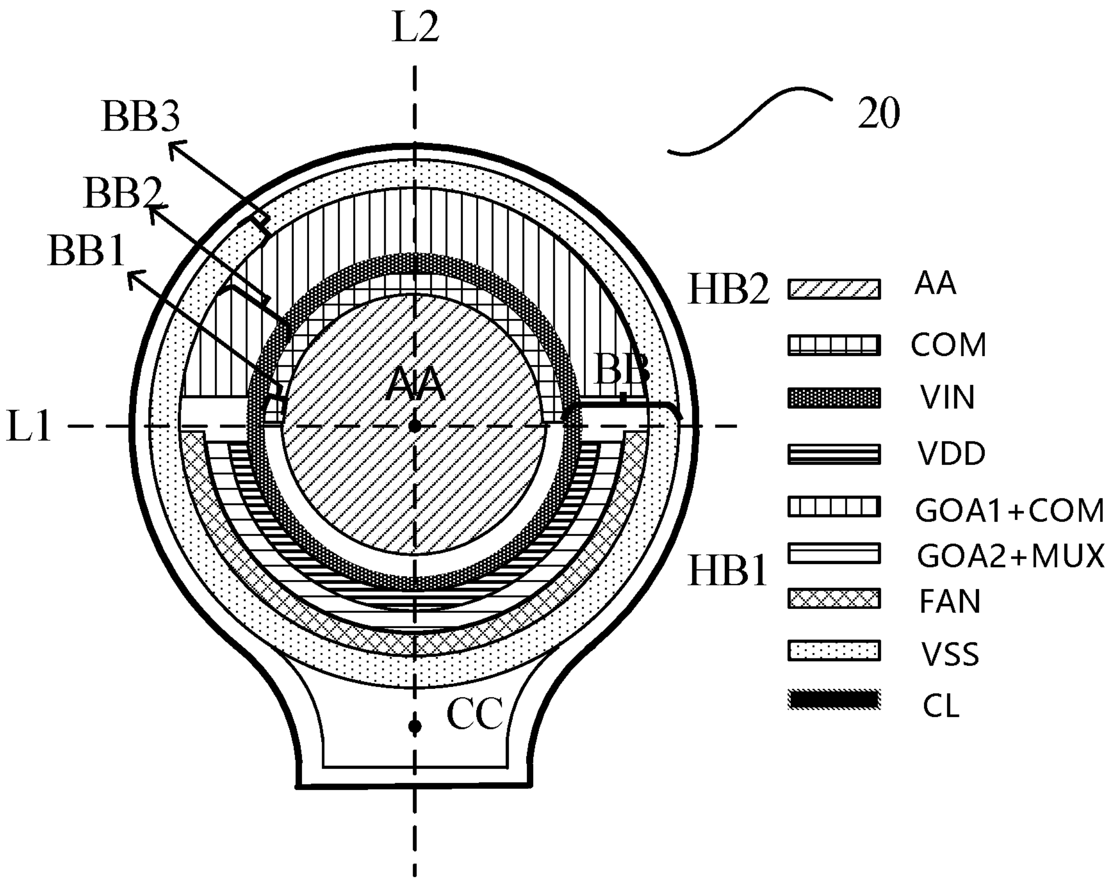
FIG. 4 shows a schematic diagram of the display panel according to an embodiment of the present disclosure.

FIG. 4 shows a schematic diagram of the display panel according to other embodiments of the present disclosure. FIG. 4 only shows an embodiment in which the pixel array in the display area AA has the circular outline, however it could be understood that the outlines with other shapes are possible. As shown in FIG. 4, the compensation circuits COM include a first portion located in the first area BB1 and a second portion located in the second area BB2. The compensation circuits COM are all used to compensate for the parasitic capacitance of pixel. Similar to FIG. 1, the display panel 20 includes the reset signal line VIN. The reset signal line VIN is in the second area BB2 and surrounds the first area BB1. The reset signal line VIN is used to provide the reset voltage signal to the pixels during a reset phase. In an embodiment of the present disclosure, the first portion or the second portion of the compensation circuit COM may be a complete circuit with compensation function, or may be some electrical components or a part of electrical component in the compensation circuit COM. In an embodiment of the present disclosure, the non-display area BB includes a first half area HB1 divided by a center line L1 of the pixel array. The center line L1 may form any angle with a line L2 connecting the center of the pad area CC and the center of the pixel array. In an embodiment of the present disclosure, the center line L1 may be perpendicular to the line L2 connecting the center of the pad area CC and the center of the pixel array. In an embodiment of the present disclosure, the center refers to a center of a geometry. Specifically, the center of the pixel array refers to the center of the geometry of the pixel array. In this case, the first half area HB1 is also referred to as the lower half of the non-display area BB, and the second half area is also referred to as the upper half of the non-display area BB. The first half area HB1 and the second half area HB2 of the display panel 20 as shown in FIG. 4 will be described in detail below with reference to FIGS. 5 and 6.

Figure 5:
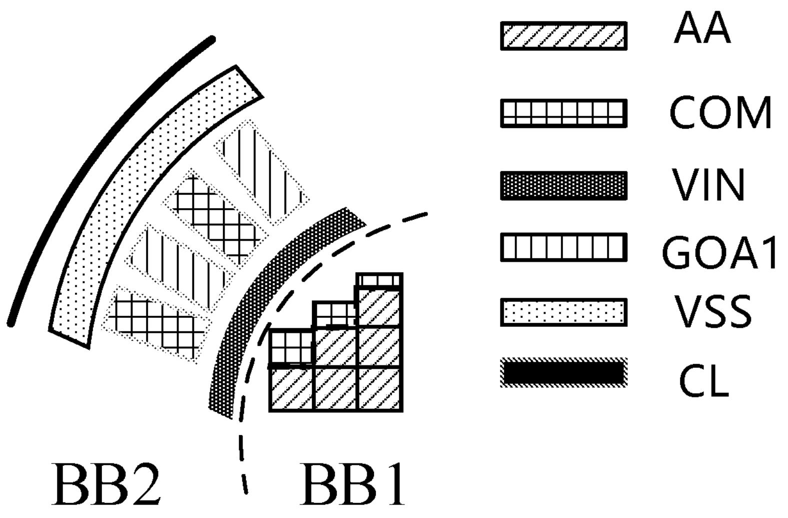
FIG. 5 shows a partial schematic view of a second half of the non-display area of the display panel as shown in FIG. 4.

FIG. 5 shows a partial schematic view of the second half HB2 of the non-display area BB of the display panel 20 as shown in FIG. 4. In an embodiment of the present disclosure, the second portion of the compensation circuit COM is aligned with the first shift register circuit GOA1 in the circumferential direction of the pixel array. In an embodiment of the present disclosure, "the element A and the element B are aligned in a certain direction" means that the element A and the element B at least partially overlap in the certain direction. As shown in FIG. 5, compared to FIG. 2, the first shift register circuit GOA1 is alternately arranged in the circumferential direction with the second portion of the compensation circuit COM, but not with the test circuit CT. This can reduce the width of the display panel by several hundred micrometers, such as 0.2 mm. The first shift register circuit GOA1 is used to provide a reset driving signal to the pixels in the reset phase, and to provide a gate driving signal to the pixels in the display phase. The test circuit CT is used, for example, to test the display panel in the process of fabricating the display panel, and is no longer used during a service period of the display panel leaving its factory. The pad area CC is disposed adjacent to the first half area HB1. As shown, the second portion of the compensation circuit COM and the first shift register circuit GOA1 are in the second half area HB2.

Figure 6:
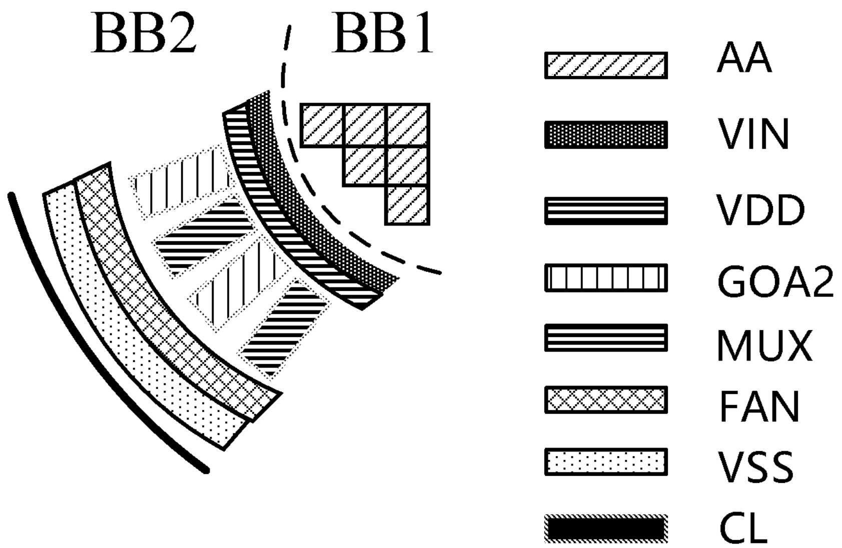
FIG. 6 shows a partial schematic view of a first half of the non-display area of the display panel as shown in FIG. 4.

FIG. 6 shows a partial schematic view of the first half HB1 of the non-display area BB of the display panel 20 as shown in FIG. 4. The power supply line VDD may be in the second area BB2 and in the first half area HB1. The power supply line VDD is used to provide power voltage signals to the electrical components on the display panel. Compared to FIG. 1, in this embodiment, no corresponding power supply line VDD is arranged in the upper half of the non-display area. This embodiment will be described below with reference to FIG. 7.

Figure 7:
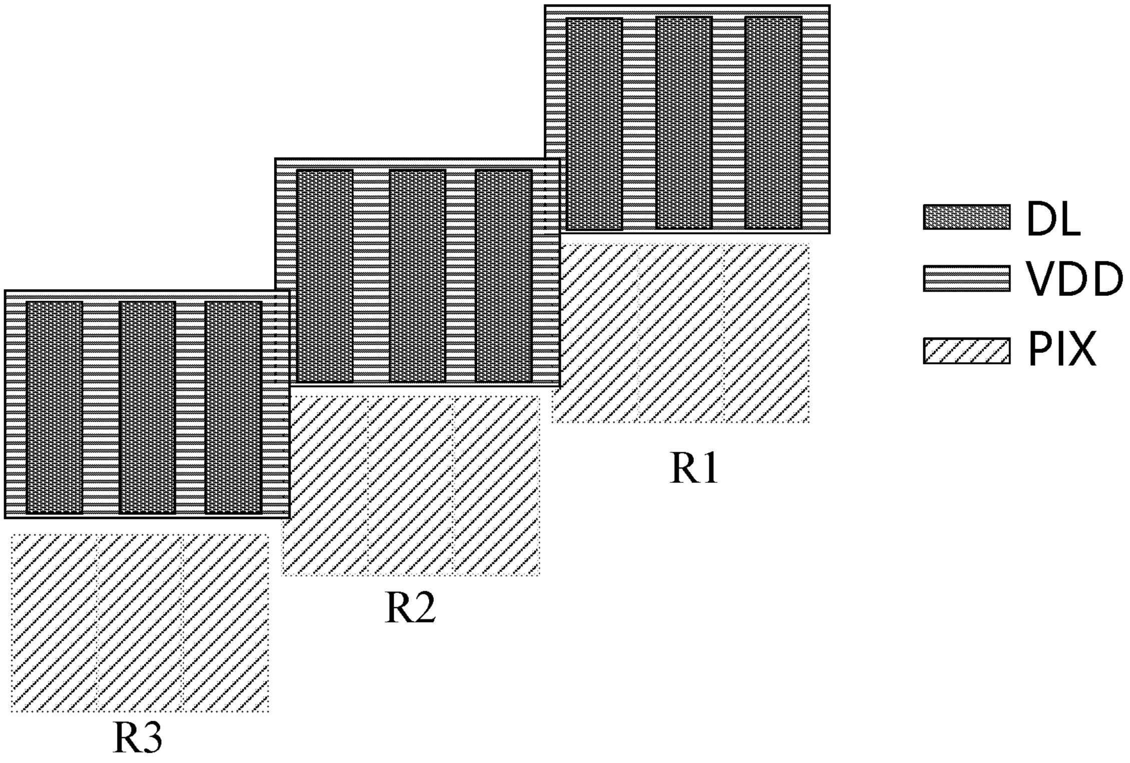
FIG. 7 shows a schematic diagram of the design of a compensation circuit according to an embodiment of the present disclosure.

FIG. 7 shows a schematic diagram of the design of the compensation circuit COM according to an embodiment of the present disclosure. As shown, the data signal line DL and the power supply line VDD are respectively disposed on two adjacent metal layers in the step-area of the pixels to form the compensation capacitance, thereby compensating for the sensing capacitance of the corresponding pixel. As mentioned above, the farther the pixel column is away from the center pixel column, the larger the parasitic capacitance needs to be compensated for, and the larger the area of the non-display area BB is occupied by the corresponding compensation circuit COM. As shown, the area occupied by the compensation circuit COM of the pixel row R3 that is farther away from the center pixel row R1 is larger than that of the pixel row R2 that is closer to the center pixel row R1. The power supply lines VDD corresponding to the respective pixel columns are connected in series with each other. The power supply lines VDD can be used to reduce the voltage drop and improve the uniformity of the display panel. Therefore, the power supply lines VDD in the upper half of the non-display area as shown in FIG. 2 can reduce the bezel of the display panel by tens to hundreds of microns.

Continuing to refer to FIG. 4, the display panel 20 may further include the second shift register circuit GOA2 and the multiplexing circuit MUX located in the first half area HB1 and on a side, away from the first area BB1, of the power supply line VDD. The second shift register circuit GOA2 is used to provide light-emitting signals to the pixels during a display phase. The multiplexing circuit MUX is used for multiplexing the data signal lines for the pixels. In an embodiment of the present disclosure, the multiplexing circuit may supply power to six columns of pixels through one data signal line. As shown in FIG. 6, the second shift register circuit GOA2 may be alternately arranged with the multiplexing circuit MUX in the circumferential direction. The display panel 20 further includes a wiring area FAN. The wiring area is in the first half area HB1, and on a side of the second shift register circuit GOA2 and the multiplexing circuit MUX away from the first area BB1.

As shown in FIG. 4, the display panel 20 includes the ground line VSS. The ground line VSS is in the third area BB3 of the non-display area. The ground line VSS is used to provide a ground voltage signal to the electrical components on the display panel 20. In an embodiment of the present disclosure, the third area BB3 surrounds the second area BB2 and is located between the second area BB2 and the pad area CC.

The embodiments of the present disclosure also provide the display device including the display panel according to any embodiment of the present disclosure.

Figure 8:
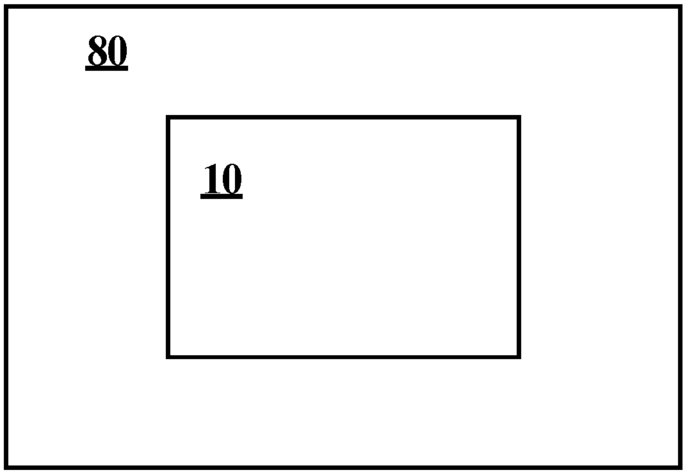
FIG. 8 shows a schematic structural diagram of a display device according to an embodiment of the present disclosure.

FIG. 8 shows a schematic structural diagram of the display device according to an embodiment of the present disclosure. As shown in FIG. 8, the display device 80 may include the display panel 10 or 20 according to any embodiment of the present disclosure.

The display device 80 may be any product or component with display function, such as a mobile phone, a tablet computer, a television, a monitor, a notebook computer, a digital photo frame, a navigator, and the like.

The display device provided by an embodiment of the present disclosure has the same or similar beneficial effects as the display panel provided by the previous embodiments of the present disclosure. Since the display panel has been described in detail in the previous embodiments, the description will be omitted.

The embodiments of the present disclosure also provide the method for fabricating the display panel 10 or 20 according to any embodiment of the present disclosure. The method for fabricating will be described in detail below with reference to FIG. 9.

Figure 9:
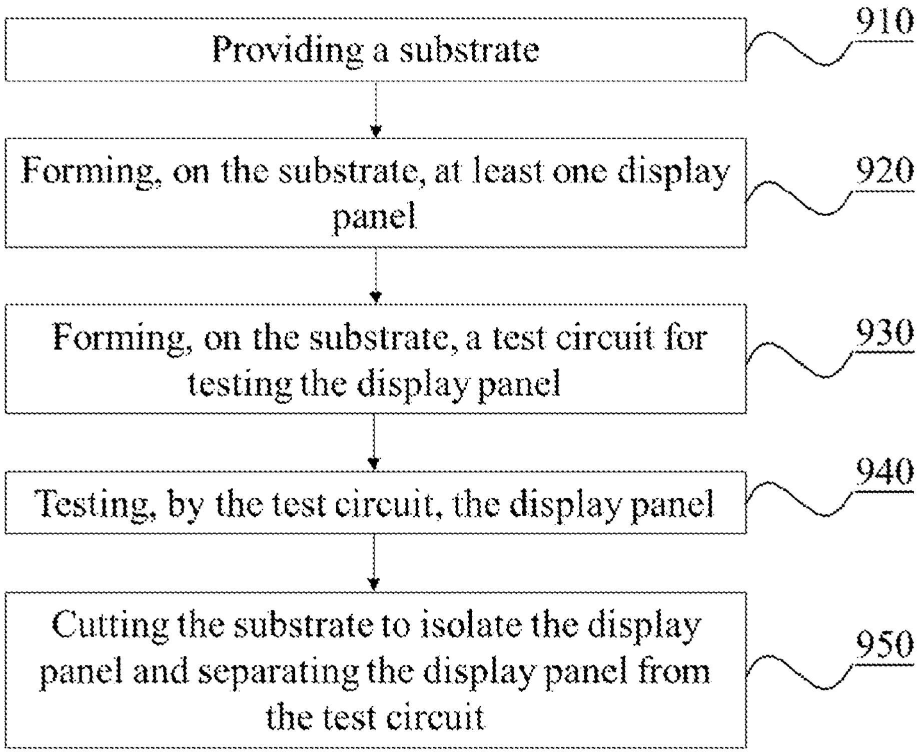
FIG. 9 illustrates a flowchart of a method, according to an embodiment of the present disclosure, for fabricating the display panel according to any embodiment of the present disclosure.

FIG. 9 illustrates a flowchart of the method, according to an embodiment of the present disclosure, for fabricating the display panel according to any embodiment of the present disclosure. As shown in FIG. 9, at step 910, a substrate is provided. In embodiments of the present disclosure, the substrate may be glass, flexible material, or special plastic.

Figure 10:
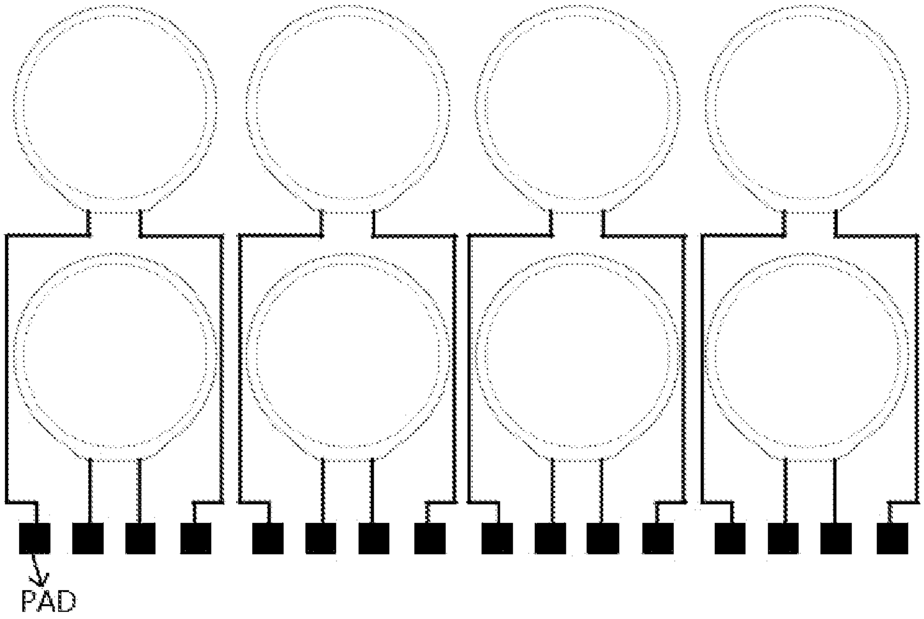
FIG. 10 illustrates a schematic diagram of a layout in which a plurality of display panels formed on a same substrate according to an embodiment of the present disclosure.

At step 920, at least one display panel is formed on the substrate. In this embodiment, the electrical components required for the display panel may be formed on the substrate through processes such as depositing metal materials, depositing insulating materials, depositing semiconductor materials, and patterning on the substrate. In an embodiment of the present disclosure, multiple display panels may be formed on the same substrate, as shown in FIG. 10. FIG. 10 illustrates a schematic diagram of the layout in which a plurality of display panels formed on the same substrate according to an embodiment of the present disclosure. FIG. 10 shows 8 display panels. Other numbers of display panels can also be simultaneously formed on the same substrate.

Figure 11:
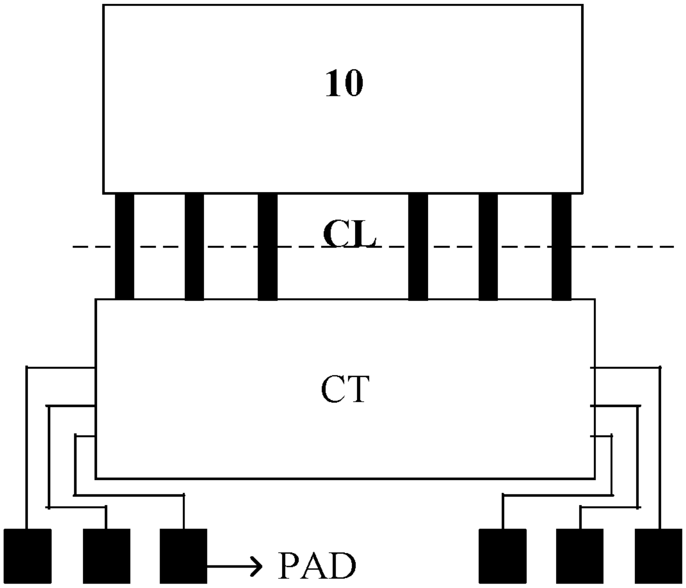
FIG. 11 shows a schematic diagram of a design for forming a test circuit outside a cutting line according to an embodiment of the present disclosure.

In step 930, the test circuit CT for testing the display panel is formed on the substrate. In an embodiment of the present disclosure, the test circuit is formed outside the cutting line, as shown in FIG. 11. FIG. 11 shows a schematic diagram of a design of the test circuit that forms the test circuit outside the cutting line according to an embodiment of the present disclosure. As shown in FIG. 11, the test circuit CT is coupled to the display panel via the pad area CC, and is coupled to the test pad PAD.

At step 940, the display panel is tested by the test circuit CT. In an embodiment of the present disclosure, a test signal can be provided to the test circuit CT through the test pad PAD, so that the CT can drive the display panel 10 or 20 according to the test signal, so as to perform the test.

At step 950, the substrate is cut to isolate the display panel and separate the display panel from the test circuit CT. In an embodiment of the present disclosure, one display panel may be separated from the test circuit on the substrate and other display panels along the cutting line as shown in FIG. 1 or FIG. 4.

The foregoing description of the embodiments has been provided for the purposes of illustration and description. It is not intended to be exhaustive or to limit this application. The respective elements or features of a particular embodiment are generally not limited to a particular embodiment, but when it's appropriate, these elements or features are interchangeable and can be used in a selected embodiment, even if not specifically shown or described. The same can also be changed in many ways. Such changes are not to be considered a departure from this application, and all such modifications are included within the scope of this application.

What is claimed is:

1. A display panel comprising a display area and a non-display area surrounding the display area, the display panel comprising:

a pixel array, an edge of which defines a boundary between the display area and the non-display area, wherein the non-display area comprises a first area and a second area arranged in sequence in a direction away from the pixel array, such that the second area is farther from the pixel array than the first area;

a compensation circuit configured to compensate for a parasitic capacitance of pixel in the pixel array, and the compensation circuit comprising a first portion located in the first area and a second portion located in the second area; and a first shift register located in the second area;

wherein the second portion of the compensation circuit is aligned with the first shift register circuit in a circumferential direction of the pixel array.

2. The display panel according to claim 1, wherein the pixel array comprises a special-shaped outline.

3. The display panel according to claim 1, wherein the first shift register circuit and the second portion of the compensation circuit are alternately arranged in the circumferential direction.

4. The display panel according to claim 3, wherein the non-display area comprises a first half area and a second half area divided by a center line of the pixel array, wherein the display panel further comprises a pad area, wherein the pad area is disposed adjacent to the first half area, and wherein the second portion of the compensation circuit and the first shift register circuit are in the second half area.

5. The display panel according to claim 4, wherein the center line is perpendicular to a line connecting a center of the pad area and a center of the pixel array.

6. The display panel according to claim 1, further comprising a power supply line located in the second area and the first half area.

7. The display panel according to claim 6, further comprising a reset signal line configured to provide a reset voltage signal to the pixels, wherein the reset signal line is in the second area and surrounds the first area.

8. The display panel according to claim 7, further comprising a second shift register circuit and a multiplexing circuit both located in the first half area and on a side, away from the first area, of the power supply line, wherein the multiplexing circuit is configured to multiplex data signal lines for the pixels.

9. The display panel according to claim 8, wherein the second shift register circuit and the multiplexing circuit are alternately arranged in the circumferential direction.

10. The display panel according to claim 8, further comprising a wiring area located in the first half area and located on a side, away from the first area, of the second shift register circuit and the multiplexing circuit.

11. The display panel according to claim 10, further comprising a ground line located in a third area of the non-display area, wherein the third area surrounds the second area and is located between the second area and the pad area.

12. A display device comprising a display panel, wherein the display panel comprises a display area and a non-display area surrounding the display area, the display panel comprises:

a pixel array, an edge of which defines a boundary between the display area and the non-display area, wherein the non-display area comprises a first area and a second area arranged in sequence in a direction away from the pixel array, such that the second area is farther from the pixel array than the first area;

a compensation circuit configured to compensate for a parasitic capacitance of pixel in the pixel array, and the compensation circuit comprising a first portion located in the first area and a second portion located in the second area; and a first shift register located in the second area;

wherein the second portion of the compensation circuit is aligned with the first shift register circuit in a circumferential direction of the pixel array.

13. A method for fabricating a display panel, wherein the display panel comprises a display area and a non-display area surrounding the display area, the display panel comprises:

a pixel array, an edge of which defines a boundary between the display area and the non-display area, wherein the non-display area comprises a first area and a second area arranged in sequence in a direction away from the pixel array, such that the second area is farther from the pixel array than the first area;

a compensation circuit configured to compensate for a parasitic capacitance of pixel in the pixel array, and the compensation circuit comprising a first portion located in the first area and a second portion located in the second area; and a first shift register located in the second area;

wherein the second portion of the compensation circuit is aligned with the first shift register circuit in a circumferential direction of the pixel array, the method comprising:

providing a substrate;

forming at least one display panel on the substrate;

forming a test circuit for testing the display panel on the substrate;

testing the display panel by the test circuit; and cutting the substrate to isolate the at least one display panel and separate the at least one display panel from the test circuit.

14. The display panel according to claim 2, wherein the first shift register circuit and the second portion of the compensation circuit are alternately arranged in the circumferential direction.

15. The display panel according to claim 14, wherein the non-display area comprises a first half area and a second half area divided by a center line of the pixel array, wherein the display panel further comprises a pad area, wherein the pad area is disposed adjacent to the first half area, and wherein the second portion of the compensation circuit and the first shift register circuit are in the second half area.

16. The display panel according to claim 15, wherein the center line is perpendicular to a line connecting a center of the pad area and a center of the pixel array.

17. The display panel according to claim 2, further comprising a power supply line located in the second area and the first half area.

18. The display panel according to claim 4, further comprising a power supply line located in the second area and the first half area.

19. The display panel according to claim 15, further comprising a power supply line located in the second area and the first half area.

20. The display panel according to claim 5, further comprising a power supply line located in the second area and the first half area.

* * * * *